United States Patent
Shao

(10) Patent No.: US 9,409,487 B2
(45) Date of Patent: Aug. 9, 2016

(54) ELECTRIC AUTOMOBILE PWM RECTIFICATION AND CONVERTING VOLTAGE/CURRENT PULSE CHARGING SYSTEM

(76) Inventor: Zehua Shao, Chengdu (CN)

( * ) Notice: Subject to any disclaimer, the term of this patent is extended or adjusted under 35 U.S.C. 154(b) by 324 days.

(21) Appl. No.: 14/112,462

(22) PCT Filed: Apr. 13, 2012

(86) PCT No.: PCT/CN2012/073982
§ 371 (c)(1),
(2), (4) Date: Oct. 17, 2013

(87) PCT Pub. No.: WO2012/142925
PCT Pub. Date: Oct. 26, 2012

(65) Prior Publication Data
US 2014/0035530 A1    Feb. 6, 2014

(30) Foreign Application Priority Data
Apr. 18, 2011    (CN) .................. 2011 2 0113893 U

(51) Int. Cl.
*B60L 11/18*    (2006.01)
*H02J 7/00*    (2006.01)
(Continued)

(52) U.S. Cl.
CPC .......... *B60L 11/1811* (2013.01); *B60L 3/0046* (2013.01); *B60L 11/184* (2013.01);
(Continued)

(58) Field of Classification Search
CPC .................................... B60L 11/1811
USPC .......................................... 320/109
See application file for complete search history.

(56) References Cited

U.S. PATENT DOCUMENTS

| | | | |
|---|---|---|---|
| 5,642,270 A | * | 6/1997 | Green .................. B60L 11/126 363/17 |
| 5,656,916 A | * | 8/1997 | Hotta ..................... B60L 1/003 180/65.1 |

(Continued)

FOREIGN PATENT DOCUMENTS

| | | |
|---|---|---|
| CN | 10119789 A | 1/2008 |
| CN | 201198281 Y * | 2/2009 |

(Continued)

OTHER PUBLICATIONS

International Search Report for PCT/CN2012/073982 mailed Jul. 26, 2012, 4 pages.

*Primary Examiner* — Richard Isla Rodas
*Assistant Examiner* — Dung V Bui
(74) *Attorney, Agent, or Firm* — Hamre, Schumann, Mueller & Larson, P.C.

(57) ABSTRACT

The invention discloses a kind of electric automobile PWM rectification and converting voltage/current pulse charging system which is the charging system for large storage battery. The system includes rectifier module and charging module. The former links with AC network and charge module respectively. The said charging system also includes DC charging management module and the charging module is composed of DC input module and DC output module. The said rectifier module, DC input module and DC output module, DC charging management module are independent and connected together by CAN bus. The electric automobile PWM rectification and converting voltage/current pulse charging system of this invention is simply structured with a small size and features wide range of application e.g. charging for all lead and zinc storage batteries. It greatly reduces the duration for charging storage batteries and is worthy of scale popularizing.

9 Claims, 3 Drawing Sheets

Figure 1:
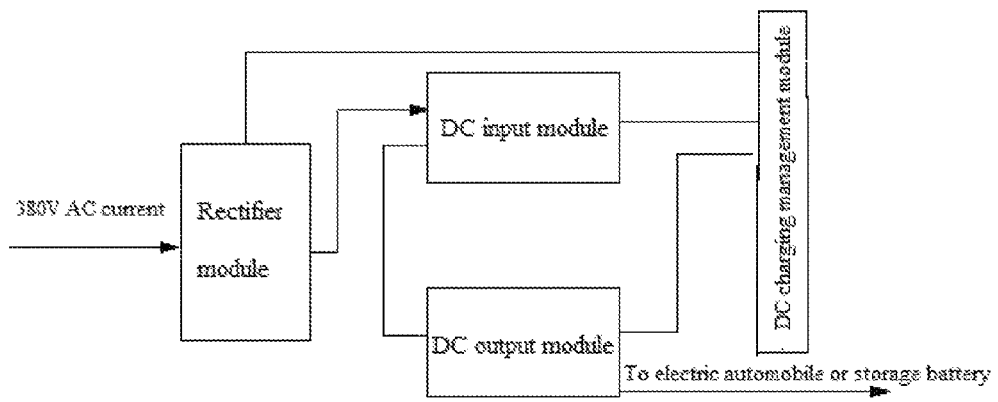

(51) Int. Cl.
*B60L 3/00* (2006.01)
*H02J 7/02* (2016.01)

(52) U.S. Cl.
CPC .......... *B60L 11/185* (2013.01); *B60L 11/1816* (2013.01); *B60L 11/1824* (2013.01); *B60L 11/1844* (2013.01); *B60L 11/1846* (2013.01); *B60L 11/1848* (2013.01); *H02J 7/0029* (2013.01); *H02J 7/0093* (2013.01); *B60L 2210/00* (2013.01); *B60L 2210/10* (2013.01); *B60L 2210/30* (2013.01); *B60L 2210/40* (2013.01); *B60L 2230/16* (2013.01); *B60L 2230/40* (2013.01); *B60L 2250/12* (2013.01); *H02J 7/022* (2013.01); *H02J 2007/0039* (2013.01); *H02J 2007/0096* (2013.01); *Y02E 60/721* (2013.01); *Y02T 10/7005* (2013.01); *Y02T 10/7016* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| 2004/0095784 | A1* | 5/2004 | Zhou ..................... H02M 5/458 363/37 |
| 2004/0169489 | A1 | 9/2004 | Hobbs |
| 2004/0189251 | A1* | 9/2004 | Kutkut ................... H02J 7/022 320/128 |
| 2006/0132061 | A1* | 6/2006 | McCormick ........ H02M 1/4258 315/291 |
| 2009/0103341 | A1* | 4/2009 | Lee ......................... H02J 7/022 363/124 |
| 2010/0007293 | A1* | 1/2010 | Meadors ............. B60L 11/1811 318/139 |
| 2010/0017249 | A1* | 1/2010 | Fincham .................. B60L 3/12 705/412 |
| 2010/0156355 | A1* | 6/2010 | Bauerle .................. B60L 3/003 320/145 |
| 2011/0006731 | A1* | 1/2011 | Wang .................. B60L 11/1816 320/109 |
| 2014/0035530 | A1* | 2/2014 | Shao ..................... B60L 11/185 320/109 |

FOREIGN PATENT DOCUMENTS

CN 102185367 A 9/2011
CN 202019221 U 10/2011

* cited by examiner

ELECTRIC AUTOMOBILE PWM RECTIFICATION AND CONVERTING VOLTAGE/CURRENT PULSE CHARGING SYSTEM

TECHNICAL FIELD

The invention covers a charging system for large storage battery, more specifically, a kind of electric automobile PWM rectification and converting voltage/current pulse charging system.

TECHNICAL BACKGROUND

At present, electric automobile is not an unfamiliar term. It prevails over internal combustion automobile with the obvious advantages in the aspect of pollution and noise, which has been contributed to the rapid development. The electric automobile is powered by the large storage battery, thus technology for charging the storage battery is crucial. Because of the lower power and undemanding requirement of charging rate, the general household charger usually has a longer charging duration and is inapplicable for the electric automobile. Commercial charger for the electric automobile must feature less battery loss and pollution and high rate. The large storage battery used by the electric automobile has high capacity and power and long service life. Thus, its charger, especially the commercial charging equipment equivalent to the fuelling station for the internal combustion automobile, requires very high power as such charging equipment will charge all storage batteries of one or even more automobiles rather than only one battery. However, blindly increasing the power of the charging equipment will exert considerable influence on the power grid in the course of use and high power is the main factor affecting the power grid.

The traditional powerful charging equipment is designed based on the phase-controlled rectification technology and uses the thyristor as power device. In addition the general three phase rectification technology for charger, such charging equipment also develop the multi-wave charger, but the charger based on the phase-controlled rectification technology is heavy with low power factor and more harmonic pollution. The charger with lower power factor will have a great effect on the power grid and other electrical appliances when the charge is increasingly loaded. To solve the problems in aspects of the power factor and harmonic pollution, such phase-controlled charger must be equipped with the proper devices for harmonic suppression and reactive power compensation which will increase the size of equipment and cost. However, these measures still can not solve the described problems basically.

Just as filling the internal combustion automobile, charging the electric automobile can be completed in around ten minutes normally. For the on-board charger of the electric automobile, the storage battery can be charged wherever there is the power outlet available, but has limited power handling capacity as it is subject to the space on the automobile. It can only provide slow charging with little current and has long duration of charging. When using the traditional charging technology, the duration for charging the storage battery of the electric automobile may be 12 hours at least. Besides, the traditional charging mode is too simple which may shorten the service life of the storage battery. It can be said charging the electric automobile with traditional technology simply could not be popularized.

Consequently, it is necessary to develop a fast charging system with high power factor and low harmonic and free from devices for harmonic suppression and reactive power compensation.

SUMMARY OF INVENTION

The invention aims to solve the above-mentioned technical problems by providing an electric automobile PWM rectification and converting voltage/current pulse charging system with high power factor and low harmonic and free from devices for harmonic suppression and reactive power compensation.

To solve the above technical difficulties, the invention adopts the following technical solutions:

A kind of electric automobile PWM rectification and converting voltage/current pulse charging system, which comprises rectifier module and charging module, the former linking with AC network and charge module respectively; the described charging system also includes DC charging management module, wherein the charging module is composed of DC input module and DC output module; the described rectifier module, DC input module and DC output module, DC charging management module are independent and connected together by CAN bus.

Rectifier module rectifies the alternating current of power input and forms the steady DC output voltage after smoothing which is provided to the DC converter module in the subsequent DC output module. In the described DC converter module, bi-directional DC-DC converter is employed to realize the multiple modes of charging for the storage battery of the electric automobile. The charging modes include constant voltage limited current charging, constant current limited voltage charging, three-stage charging, intermittent pulse charging and positive and negative pulse charging.

The described rectifier module includes air switch, precharge resistor, AC contactor, input-side inductor, three-phase full-controlled bridge converter, PWM rectifier, DC bus capacitor, dummy load, power tube drive and digital logic protection circuit, and control unit; the described power tube drive chip and drive module and isolated power supply convert PWM pulse signal sent out by the chip in the control unit into the driving IGBT or IPM pulse, and feed back trouble signal to the digital logic protection circuit when the overcurrent occurs on the power devices; the AC-side of the described PWM rectifier adopts the filter inductance which realizes the control of AC-side unity power factor and four-quadrant operation of the PWM rectifier and filters the AC-side harmonic current of the PWM rectifier; the DC input module is managed to meter the DC current, control the DC power supply and secure the DC input and output.

The DC output can communicate with the on-board energy management system, convert the output power, and match up with the voltage and current required by the output battery charging.

The DC charging module realizes human-computer interaction for interface display, identification, fees charging, receipt printing, data management, current make-and-break current control, and remote monitoring.

The described control unit is composed of the controller and PWM rectifier control panel. The latter is a double closed loop control system formed by inner current loop and outer voltage loop. The described double closed loop control system is realized by using the digital regulator, adopts the direct current control for the closed loop control of the rectifier input current and realizes the high precision control of instantaneous current waveform by the current.

As the preferred, the further technical solutions are: the described transformer is the epoxy resin casting dry type transformer with the star connection for primary and secondary coils to the AC network and to the input end of the rectifier respectively; the described rectifier is PWM rectifier which realizes the sinusoidal current at AC network side of the transformer, controllable power factor and bidirectional power transmission.

Further technical solutions are: the described double closed loop control system has DSP as the master control chip and employs the voltage space vector PWM to control the input current and output voltage, realizing the sinusoidal current at the AC network side of the transformer and the stabilized unity power factor and DC output voltage; the controller is used to realize the human-computer interaction interface where the master-slave RS485 bus is used to communicate with and send the running command to the PWM rectifier control panel, control the PWM rectifier and obtain running status and parameters of the PWM rectifier.

Further technical solutions are: the described input module comprises power control unit, charging electric energy metering module, control panel and power control panel.

Further technical solutions are: the described power control unit is realized with the contactor and protective device making the rectified circuit and the post-level circuit securely isolated and controllable, the control signal coming from DC charging management module; the charging electric energy metering module employs the high precision sensor to sample the voltage and current and to meter the charging electric energy, and uploads the electric energy data to the DC charging management module through RS485 communication interface; the control panel is equipped with 16-bit one-chip computer with DSP as the master control chip for communication and driving functions; the power control panel has multiple integrated power modules which can convert 220V AC supply voltage into different classes of DC supply voltage providing the steady working voltage for the control panel and sensor.

Further technical solutions are: the described DC output module is composed of DC converting module, control panel and power control panel.

Further technical solutions are: the described control panel adopts equipped with 16-digit one-chip computer as the master control chip for communication and driving functions; the power control panel has multiple integrated power modules which can convert 220V AC supply voltage into different classes of DC supply voltage providing the steady working voltage for the control panel and sensor.

Further technical solutions are: the described DC charging management module comprises embedded controller, display screen, RF card reader, CAN communication card, remote monitoring communication expansion card and miniprinter; the DC charging management module as the control center of the charging system links with each module with CAN or RS485 bus, sending various work command to the modules, receiving feedback information from modules, and coordinating work sequence and logic between modules.

Further technical solutions are: the described DC charging management module reads the user's information with RF card reader, displays IC card information, instructs the user to connect charging plug correctly, select the charging duration and mode, and conforms the charging activated; during the charging, the embedded controller obtains electricity quantity data regularly (when the charging duration or quantity of electricity reaches to the value set by the user, the command of stop charging will be sent to the DC input module), controls the contactor's execution in the DC input module, cuts off the power, gives prompt of charging completed on the screen and allows the user to make payment, view consumption information and print receipt after unplugging.

Comparing to the existing technologies, beneficial effects of the invention are: the sinusoidal current at the AC network side of the transformer and the stabilized unity power factor and DC output voltage can be realized in the process of charging the electric automobile; control of zero pressure and zero flow can also be realized during the power conversion control with the maximum system efficiency up to 95%, as a result, the harmonic content in the automobile's charging system during the charging can be cut down and pollution to the power grid caused by the charging system and equipment can also be reduced for the efforts of energy conservation and environmental protection. In addition, the DC output module in the charging system has multiple charging modes available to meet the needs of the various electric automobile storage batteries and for easy and flexible use. The module gives priority to adopting the positive and negative pulse charging mode, solving the problem of long charging duration of the electric automobile storage battery. For the problem of fast charging with damage to the storage battery, the module help realize the shortened charging duration with less damage to the battery and longer service life of the battery for practical demand. The invention also presents a kind of electric automobile PWM rectification and converting voltage/current pulse charging system which features wide range of application e.g. for all lead and zinc storage batteries. It greatly reduces the duration for charging storage batteries and is worthy of scale popularizing.

DIAGRAMS

Figure 2:
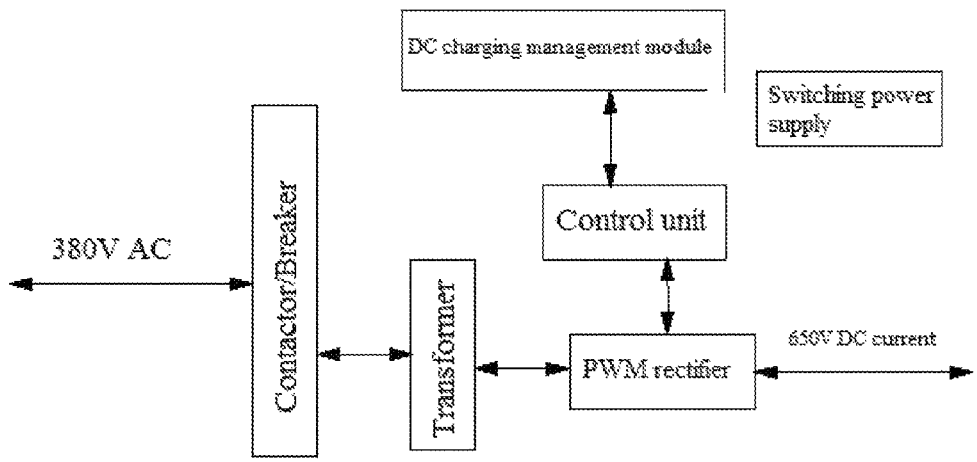
Figure 3:
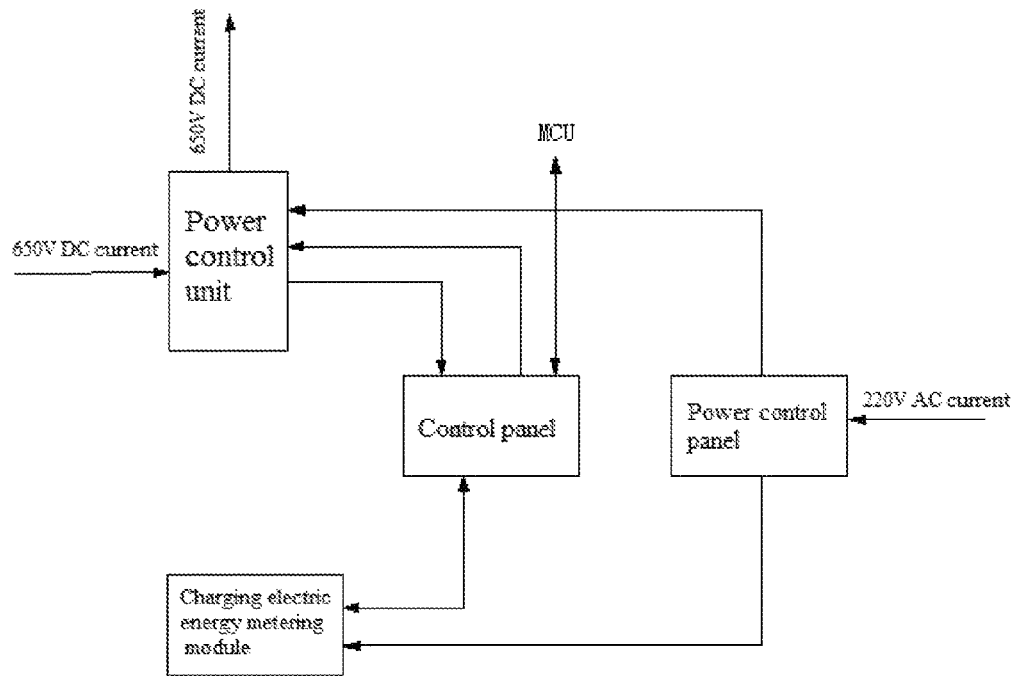
Figure 4:
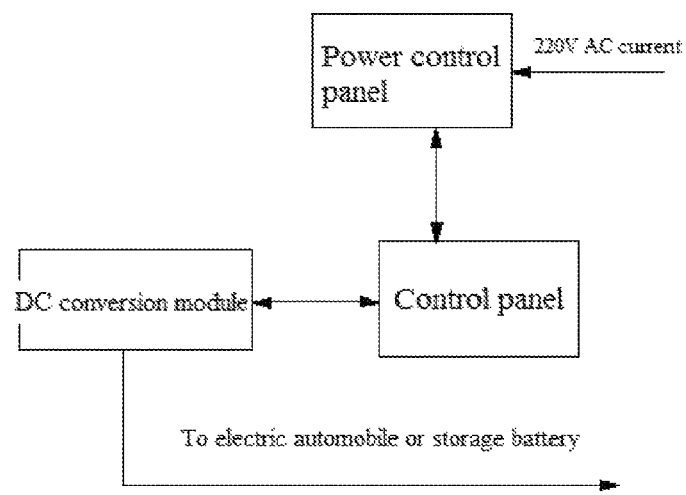
Figure 5:
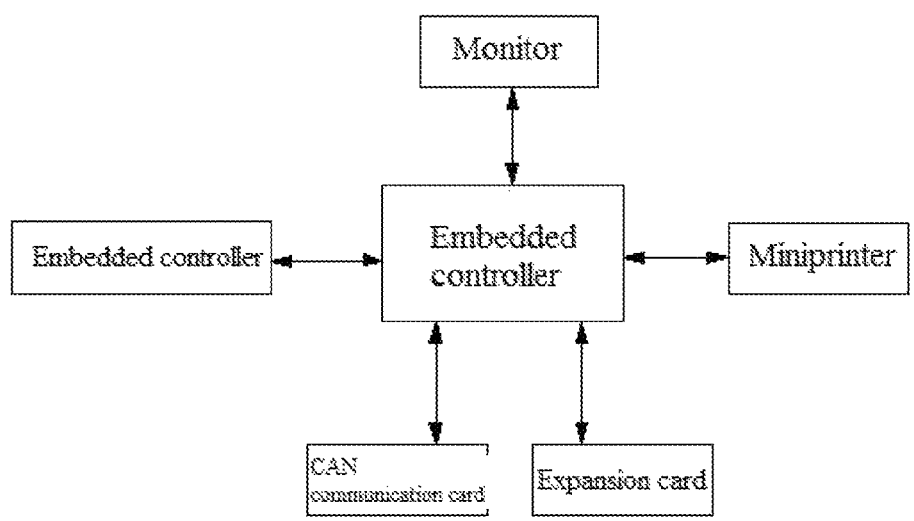

FIG. 1: System Structural Frame of the Invention;
FIG. 2: Rectifier Module Circuit Structure Frame in Embodiment 1 of the Invention;
FIG. 3: DC Input Module Circuit Structure Frame in Embodiment 1 of the Invention;
FIG. 4: DC Output Module Circuit Structure Frame in Embodiment 1 of the Invention;
FIG. 5: DC Charging Management Module Circuit Structure Frame in Embodiment 1 of the Invention.

IMPLEMENTATION MODE

The further descriptions of the invention are given along with the diagrams.

Embodiment 1

As shown in Diagram 1, a kind of electric automobile PWM rectification and converting voltage/current pulse charging system, which comprises rectifier module and charging module, the former linking with AC network and charge module respectively. In this embodiment, the rate voltage of the AC network is 380V; the described charging system also includes the DC charging management module, wherein the DC charging management module comprises the DC input module and DC output module, and the rectifier module, DC input module, DC output module and DC charging management module are all independent and connected together by CAN bus; four independent modules have the following functions: the Rectifier module rectifies the alternating current of power input and forms the steady DC output voltage after smoothing which is provided to the converter module in the subsequent DC output module; the DC input module is managed to meter the DC current, control the DC power supply and secure the DC input and output; the DC output can communicate with the on-board energy management system, convert the output power, and match up with the voltage and current required by the output battery charging; the DC charging module realizes human-computer interaction for interface display, identification, fees charging, receipt printing, data management, current make-and-break current control, and remote monitoring.

As shown in Diagram 2, to better reflect the effect of transformation and convert from AC to DC, it is recommended to equip the rectifier module with the transformer, rectifier, control unit and switching power supply, wherein the transformer is to isolate the output and input of main power source and regulate the voltage; the rectifier is to convert the power source from AC to DC; the control unit is to generate the PWM pulse signal necessary for the rectifier and give control and various logic protection to the power devices; the switching power supply is to provide the voltage of all classes necessary for controlling. In the embodiment, for the better presentation of voltage regulation effect, the transformer is the epoxy resin casting dry type transformer with the star connection for primary and secondary coils to the AC network and to the input end of the rectifier respectively; the rectifier is PWM rectifier, realizing the sinusoidal current at AC network side of the transformer, controllable power factor and bidirectional power transmission. It is recommended that the control unit comprises the controller and PWM rectifier control panel, where the PWM rectifier control panel is a double closed loop control system formed by inner current loop and outer voltage loop; the double closed loop control system has DSP as the master control chip and employs the voltage space vector PWM to control the input current and output voltage, realizing the sinusoidal current at the AC network side of the transformer and the stabilized unity power factor and DC output voltage; the controller is used to realize the human-computer interaction interface where the master-slave RS485 bus is used to communicate with and send the running command to the PWM rectifier control panel, control the PWM rectifier and obtain running status and parameters of the PWM rectifier.

As shown in Diagram 3 and 4, for the above-mention DC input module and DC output module, in consideration of the accordance with the rectifier module and the compatibility with the charging system, the DC input module may accord priority to comprising the power control unit, charging electric energy metering module, control panel and power control panel. The DC output module is composed of the DC converting module, control panel and power control panel. The power control unit in the DC input module is realized with the contactor and protective device making the rectified circuit and the post-level circuit securely isolated and controllable, the control signal coming from DC charging management module; the charging electric energy metering module employs the high precision sensor to sample the voltage and current and to meter the charging electric energy, and uploads the electric energy data to the DC charging management module through RS485 communication interface; the control panel is equipped with 16-digit one-chip computer with DSP as the master control chip for communication and driving functions; the power control panel has multiple integrated power modules which can convert 220V AC supply voltage into different classes of DC supply voltage providing the steady working voltage for the control panel and sensor. For the DC converting module in the DC output module, the bi-directional DC-DC converter is employed to realize the multiple modes of charging for the storage battery of the electric automobile. The charging modes include constant voltage limited current charging, constant current limited voltage charging, three-stage charging, intermittent pulse charging and positive and negative pulse charging for free selection. The control panel is equipped with 16-digit one-chip computer with DSP as the master control chip for communication and driving functions; the power control panel has multiple integrated power modules which can convert 220V AC supply voltage into different classes of DC supply voltage providing the steady working voltage for the control panel.

The DC charging management module as the control center of the charging system as shown in Diagram 5, comprises embedded controller, display screen, RF card reader, CAN communication card, remote monitoring communication expansion card and miniprinter; it links with each module with CAN or RS485 bus, sends various work command to the modules, receives feedback information from modules, and coordinates working sequence and logic between modules. The concrete features are: the DC charging management module reads the user's information with RF card reader, displays IC card information, instructs the user to connect charging plug correctly, select the charging duration and mode, and conforms the charging activated; during the charging, the embedded controller obtains electricity quantity data regularly (when the charging duration or quantity of electricity reaches to the value set by the user, the command of stop charging will be sent to the DC input module), controls the contactor's execution in the DC input module, cuts off the power, gives prompt of charging completed on the screen and allows the user to make payment, view consumption information and print receipt after unplugging.

The electric automobile PWM rectifier and converting voltage and current pulse charging system of the invention functions as follows: 380V AC grid is switched in through the rectifier module which converts the 380V alternating current into the 650V direct current by means of PWM rectification and sends the 650V direct current to the DC input module; the control power panel in the DC input module leads in the 220V alternating current, providing the steady working voltage for the control panel and sensor; after regulated by the DC input module, the 650V direct current enters into the DC output module and then the status of voltage can be changed through the voltage bi-directional DC-DC converter herein to make available the multiple charging modes including the constant voltage limited current charging, constant current limited voltage charging, three-stage charging, intermittent pulse charging and positive and negative pulse charging; the DC output module links with the electric automobile or storage battery and then the charging begins after the charging mode of DC-DC converter is set; the DC charging management module connects with each module with CAN or RS485 bus, sending various work command to the modules and receiving feedback information from modules.

Embodiment 2

As shown in Diagram 1, a kind of electric automobile PWM rectification and converting voltage/current pulse charging system, which comprises rectifier module and charging module, the former linking with AC network and charge module respectively. In this embodiment, the rate voltage of the AC network is 380V; the described charging system also includes the DC charging management module, wherein the DC charging management module comprises the DC input module and DC output module, and the rectifier module, DC input module, DC output module and DC charging management module are all independent and connected together by CAN bus; four independent modules have the following functions: the Rectifier module rectifies the alternating current of power input and forms the steady DC output voltage after smoothing which is provided to the converter module in the subsequent DC output module; the DC input module is managed to meter the DC current, control the DC power supply and secure the DC input and output; the DC output can communicate with the on-board energy management system, convert the output power, and match up with the voltage and current required by the output battery charging; the DC charging module realizes human-computer interaction for interface display, identification, fees charging, receipt printing, data management, current make-and-break current control, and remote monitoring.

The rectifier module of the invention comprises air switch, pre-charge resistor, AC contactor, input-side inductor, three-phase full-controlled bridge converter, PWM rectifier, DC bus capacitor, dummy load, power tube drive and digital logic protection circuit, and control unit, wherein the power device in the rectifier module is the high power voltage controlled device IGBT or IPM to meet the requirement of system concerning power capacity and heat dissipation; the special power tube drive chip, drive module and isolated power supply is equipped to convert the PWM pulse signal sent out by the chip in the control unit into the driving IGBT or IPM pulse, and to feed back trouble signal to the digital logic protection circuit when the overcurrent occurs on the power devices. The power devices are connected to each other with the non-inductive bus so as to reduce the impact of parasitic parameter on the main circuit. The filter inductance is adopted at the AC side of the PWM rectifier for the control of AC-side unity power factor, four-quadrant operation of the PWM rectifier and filtering of the AC-side harmonic current of the PWM rectifier, as a results, the control of AC-side sinusoidal current is realized, giving the PWM rectifier with the BOOST PWM AC/DC converting performance and ensuring the steady operation of the charging system. At the DC side of the PWM rectifier, there is a filter circuit withstanding the voltage of 1200V and with the capacity of 40000 uF. The filter circuit is formed by several series-parallel 400V electrolytic capacitors or several film capacitor in parallel and functions to restrain the DC-side harmonic voltage, buffering the energy conversion between AC side and DC side, ensuring the intermediate DC voltage is smooth and steady.

The PWM rectifier in the rectifier module of the invention employs the three-phase voltage type topology structure; the master control chip in the control unit of the rectifier module adopts TI's TMS320F2812 32-bit fixed point DSP which boasts the increased rate up to 150M and processing data bits up to 32-bit fixed point and has EVA and EVB event managers equipped with 12-bit 16-channel AD data acquisition and richly functional peripheral interfaces, such as CAN and SCI, etc. making the peripheral circuit more concise. The control unit of the rectifier module is composed of TMS320F2812 and peripheral device including crystal oscillator, reset circuit, functioning for signal sampling, control algorithm operation, PWM signal output, and data source storage, etc.

The PWM rectifier control panel in the rectifier module of the invention is a double closed loop control system formed by inner current loop and outer voltage loop. The double closed loop control system has DSP as the master control chip and employs the voltage space vector PWM (SVPWM) to control the input current and output voltage. After sampling and feeding back, the DC-side output voltage compares with the given voltage reference and the difference as the input for voltage loop PI adjustor in the control panel and is output as the given AC-side current amplitude. The voltage loop PI adjustor with the given current amplitude and current feedback signal as the input obtains the instructed voltage space vector after mathematical operation, and through the space voltage vector resultant, makes the actual space voltage vector track the instructed space voltage vector so as to control the input current amplitude and phase. The design of double closed loop control system of the PWM rectifier is made by the digital regulator so that the functions activated by hardware can be realized by software for more flexible control modes and easy parameter regulation. The double closed loop control system is also designed with the direct current control for a closed-loop control of the rectifier input current and to realize the high precision control of instantaneous current waveform by the current. This control mode features good dynamic property which can compensate the difference caused by the parameter change in the system and the influence of tube voltage drop and dead zone, and easily prevent overloading and enable the overcurrent protection. For the double closed loop structure of the control panel of the PWM rectifier under the direct current control, the outer loop is the voltage loop which functions to obtain instructed instantaneous AC current through regulating the DC bus voltage, while the inner lop is the current loop which functions to give the current control according to the current instruction output from the voltage loop. As a result, the actual input current of the PWM rectifier can track the given so as to control the current of the high-power factor sinusoidal wave. In the rectifier module, the complete digital logic protection circuit is installed, where the protection of input overvoltage, input undervoltage, input default phase, output overvoltage, output overload and output short circuited through sampling the input and output voltage and output current.

The current controller for the double closed loop control system of the PWM rectifier control panel in the rectifier module of the invention is designed with the PI-regulated current control under the synchronization reference frame, where the difference between instructed and actual currents is used as the input for the PI adjustor and the PI adjustor outputs the needed voltage space vector; in the synchronization reference frame, the given current is the amount of DC current and PI adjustor can make the no-deviating regulation, ensuring the high-precision control for the system.

The control MCU in the DC input module of the invention can be TI's 16-bit one-chip computer MSP430F4152 which includes 16 KB flash memory, 512B RAM, 56 I/O ports and LCD drive, 10-bit ADC converter, and SPI and UART interfaces. The MCU has the supply voltage range of 1.8~3.6V, and in-built WatchDog circuit to prevent any one-chip computer running fault caused by external disturbance or internal programming error. The DC output control module can also be compose of backing input capacitor, filter circuit, bridge converter, high-frequency transformer, output diode rectifier bridge, output contactor and control panel. The output voltage and current signals are transmitted to the control panel via sampling and feedback circuit to compare with the given signal, and after going through the PI adjustor in the PWM rectifier control panel, are input to the PWM generation module of the DSP chip as the control signals; the bridge convertor can regulates the output current or voltage by changing the duty ratio of the control pulse. The master control chip of control panel in the DC output control module is TI's TMS320F2407 16-bit fixed point DSP; the TMS320LF2407 is internally designed with the Harvard structure, where the data space and program space are parted allowing concurrent operation of the program and data via the independent data bus and program bus; its processing speed reaches to 30 MIPS and the chip processor can integrates 1.5K-character data/ program RAM, 544-character dual-access RAM (DARAM) and 2K-character single-access RAM. The TMS320LF2407 has 32K-character Flash program's memory space and its two event managers EVA and EVB boast excellent functions including generation of various PWM waveforms as required. The TMS320LF2407 also integrates 16-channel 10-bit A/D convertor, SCI serial communication, CAN bus and other modules.

Additionally, in the electric automobile PWM rectification and converting voltage/current pulse charging system, XC95144XL CPLD is used to realize the digital logic protection and the related extended functions of the system, ensuring the charging system runs reliably and safely.

The DC charging management module of the invention is compose of the embedded controller, touch display screen, RF card reader, CAN communication card, communication expansion card and miniprinter. The communication and human-computer interface module of the system comprises RS485 or CAN communication, keystroke, LCD displaying circuit for data input, status and remote monitoring, customer trading and other functions of the system. The charging system also includes the bidirectional half-bridge DC-DC inverter for battery charging/discharging and positive/negative pulse charging as well as recovery of the discharged.

The control power supply of each module in the electric automobile PWM rectification and converting voltage/current pulse charging system of this invention is the switching power supply wherein the input 220V AC current is converted into 5V, 15V, 24V and other classes of source for the control panel. The switching power supply features stable output with little ripple and high reliability. Multiple measures are taken for the design of electromagnetic compatibility of the system and RCD absorbing circuit is designed for the power device loop of the master switch to suppress the voltage; the combination of multipoint and concentrated earthing is taken between each module so as to solve the electrostatic interference of the system; the varistor and transient voltage suppressor are used for the circuit interface to restrain the surge.

The electric automobile charging system and equipment are designed with various charging modes and the design of charging strategy is planned based on performance difference of different storage batteries and actual demand of the user. The system also includes the constant voltage limited current charging, constant current limited voltage charging, three-stage charging, intermittent pulse charging and positive and negative pulse charging. The DC output module samples the voltage and current signals output to the battery and sends the sampled signals into the control panel for comparing with the given signal; after going through the PI adjustor in the PWM rectifier control panel, the signals are input to the PWM generation module of the DSP chip as the control signals; and by changing the duty ratio of the control pulse, the charging current or voltage can be regulated for different charging modes.

The scope of protection of the invention is not limited to the above embodiments which are preferable and not limited to the invention itself. For the invention, any equivalent exchange, modification and deletion of any parts and modules in the PWM rectification and converting voltage/current pulse charging system and equipment for the electric automobile shall be within the scope of protection hereof.

The invention claimed is:

1. A kind of electric automobile PWM rectification and converting voltage/current pulse charging system, comprising:

a rectifier module and a charging module, the former linking with an AC network and a charge module respectively, wherein said charging system also includes a DC charging management module and the charging module is composed of a DC input module and a DC output module; said rectifier module, DC input module, DC output module and DC charging management module are independent and connected together by a CAN bus;

the rectifier module rectifies the alternating current of power input and forms the steady DC output voltage after smoothing which is provided to the DC converter module in the subsequent DC output module, in the DC converter module, bi-directional DC-DC converter is employed to realize the multiple modes of charging for the storage battery of the electric automobile, the charging modes include constant voltage limited current charging, constant current limited voltage charging, three-stage charging, intermittent pulse charging and positive and negative pulse charging;

the rectifier module includes air switch, pre-charge resistor, AC contactor, input-side inductor, three-phase full-controlled bridge converter, PWM rectifier, DC bus capacitor, dummy load, power tube drive and digital logic protection circuit, and control unit; the power tube drive chip and drive module and isolated power supply convert PWM pulse signal sent out by the chip in the control unit into the driving IGBT or IPM pulse, and feed back trouble signal to the digital logic protection circuit when the overcurrent occurs on the power devices; the AC-side of the PWM rectifier adopts the filter inductance which realizes the control of AC-side unity power factor and four-quadrant operation of the PWM rectifier and filters the AC-side harmonic current of the PWM rectifier; the DC input module is managed to meter the DC current, control the DC power supply and secure the DC input and output;

the DC output communicates with the on-board energy management system, convert the output power, and match up with the voltage and current required by the output battery charging;

the DC charging module realizes human-computer interaction for interface display, identification, fees charging, receipt printing, data management, current make-and-break current control, and remote monitoring;

the control unit is composed of the controller and PWM rectifier control panel, the latter is a double closed loop control system formed by inner current loop and outer voltage loop, the double closed loop control system is realized by using the digital regulator, adopts the direct current control for the closed loop control of the rectifier input current and realizes the high precision control of instantaneous current waveform through the current.

2. An electric automobile PWM rectification and converting voltage/current pulse charging system as claimed in claim 1, wherein the transformer is the epoxy resin casting dry type transformer with the star connection for primary and secondary coils to the AC network and to the input end of the rectifier respectively; the rectifier is PWM rectifier which realizes the sinusoidal current at AC network side of the transformer, controllable power factor and bidirectional power transmission.

3. An electric automobile PWM rectification and converting voltage/current pulse charging system as claimed in claim 1, wherein Further technical solutions are: the double closed loop control system has DSP as the master control chip and employs the voltage space vector method to control the input current and output voltage, realizing the sinusoidal current at the AC network side of the transformer and the stabilized unity power factor and DC output voltage; the controller is used to realize the human-computer interaction interface where the master-slave RS485 bus is used to communicate with and send the running command to the PWM rectifier control panel, control the PWM rectifier and obtain running status and parameters of the PWM rectifier.

4. An electric automobile PWM rectification and converting voltage/current pulse charging system as claimed in claim 1, wherein the dc input module comprises power control unit, charging electric energy metering module, control panel and power control panel.

5. An electric automobile PWM rectification and converting voltage/current pulse charging system as claimed in claim 1, wherein the power control unit is realized with the contactor and protective device making the rectified circuit and the post-level circuit securely isolated and controllable, the control signal coming from DC charging management module; the charging electric energy metering module employs the high precision sensor to sample the voltage and current and to meter the charging electric energy, and uploads the electric energy data to the DC charging management module through RS485 communication interface; the control panel is equipped with 16-digit one-chip computer with DSP as the master control chip for communication and driving functions; the power control panel has multiple integrated power modules which converts 220V AC supply voltage into different classes of DC supply voltage providing the steady working voltage for the control panel and sensor.

6. An electric automobile PWM rectification and converting voltage/current pulse charging system as claimed in claim 1, wherein the DC output module is composed of DC converting module, control panel and power control panel.

7. An electric automobile PWM rectification and converting voltage/current pulse charging system as claimed in claim 1, wherein the control panel adopts equipped with 16-digit one-chip computer as the master control chip for communication and driving functions; the power control panel has multiple integrated power modules which converts 220V AC supply voltage into different classes of DC supply voltage providing the steady working voltage for the control panel and sensor.

8. An electric automobile PWM rectification and converting voltage/current pulse charging system as claimed in claim 1, wherein the DC charging management module comprises embedded controller, display screen, RF card reader, CAN communication card, remote monitoring communication expansion card and miniprinter; the DC charging management module as the control center of the charging system links with each module with CAN or RS485 bus, sends various work command to the modules, and receives feedback information from modules, coordinate working sequence and logic between modules.

9. An electric automobile PWM rectification and converting voltage/current pulse charging system as claimed in claim 1, wherein the DC charging management module reads the user's information with RF card reader, displays IC card information, instructs the user to connect charging plug correctly, select the charging duration and mode, and conforms the charging activated; during the charging, the embedded controller obtains electricity quantity data regularly (when the charging duration or quantity of electricity reaches to the value set by the user, the command of stop charging will be sent to the DC input module), controls the contactor's execution in the DC input module, cuts off the power, gives prompt of charging completed on the screen and allows the user to make payment, view consumption information and print receipt after unplugging.

* * * * *